United States Patent
Bahramshahi et al.

(10) Patent No.: US 11,571,883 B1
(45) Date of Patent: Feb. 7, 2023

(54) THERMOPLASTIC LAMINATE INDUCTION WELDING SYSTEM AND METHOD

(71) Applicant: Rohr, Inc., Chula Vista, CA (US)

(72) Inventors: Noushin Bahramshahi, Mission Viejo, CA (US); Michael van Tooren, San Diego, CA (US); Daniel O. Ursenbach, Caledonia, IL (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/566,302

(22) Filed: Dec. 30, 2021

(51) Int. Cl.
  *B32B 43/00* (2006.01)
  *B32B 41/00* (2006.01)
  *B32B 27/08* (2006.01)

(52) U.S. Cl.
  CPC .......... *B32B 43/006* (2013.01); *B32B 27/08* (2013.01); *B32B 41/00* (2013.01); *B32B 2605/18* (2013.01); *Y10T 156/1153* (2015.01); *Y10T 156/1184* (2015.01); *Y10T 156/1911* (2015.01); *Y10T 156/1961* (2015.01); *Y10T 156/1967* (2015.01)

(58) Field of Classification Search
  CPC ............ B32B 43/006; Y10T 156/1153; Y10T 156/1184; Y10T 156/1911; Y10T 156/1961; Y10T 156/1967
  See application file for complete search history.

(56) References Cited

U.S. PATENT DOCUMENTS

| | | | |
|---|---|---|---|
| 3,441,460 A | 4/1969 | Carmichael | |
| 4,380,484 A | 4/1983 | Repik | |
| 4,485,295 A * | 11/1984 | Kellermeyer | B26F 3/08 83/16 |
| 5,454,287 A * | 10/1995 | Fuchigami | G05B 19/409 83/881 |
| 6,119,567 A * | 9/2000 | Schindler | B26F 3/08 83/171 |
| 2003/0121601 A1* | 7/2003 | Tajima | G09F 7/18 156/701 |
| 2006/0087217 A1* | 4/2006 | Kijima | H01J 31/123 313/493 |
| 2012/0247290 A1* | 10/2012 | Leyens | B26D 7/1845 83/109 |
| 2014/0102270 A1* | 4/2014 | Teck | B26D 7/08 83/13 |
| 2016/0195968 A1* | 7/2016 | Zhan | B26F 3/12 345/173 |
| 2020/0247106 A1* | 8/2020 | Lee | H01L 31/048 |
| 2020/0376825 A1* | 12/2020 | Baba | B32B 43/006 |

* cited by examiner

*Primary Examiner* — Philip C Tucker
*Assistant Examiner* — Nickolas R Harm
(74) *Attorney, Agent, or Firm* — Getz Balich LLC

(57) ABSTRACT

A method of and system for removing a portion of a thermoplastic component is provided. The component includes a thermoplastic material having a melting temperature. The method includes: a) providing a glider that includes an electrically conductive material operable to produce thermal energy resulting from electrical resistance; b) heating a portion of the glider with electrical energy to a glider operating temperature that is equal or greater than the melting temperature; and c) removing the portion by engaging the component with the glider and translating one of the glider or the component relative to the other. The engagement of the glider and the component causes an amount of the thermoplastic material to melt, and the translation of the one of the glider or the component relative to the other removes the portion from the thermoplastic component.

14 Claims, 3 Drawing Sheets

THERMOPLASTIC LAMINATE INDUCTION WELDING SYSTEM AND METHOD

BACKGROUND OF THE INVENTION

1. Technical Field

The present disclosure relates to methods for repairing thermoplastic components in general, and to methods for removing a portion of a thermoplastic component for repair purposes in particular.

2. Background Information

Components made from thermoplastic materials are increasingly in demand in the aircraft and other industries as a result of the wide-ranging advantages of the materials. Thermoplastic materials can be used to form lightweight and high-strength structures having complex shapes. In addition, thermoplastic materials, as compared to thermoset materials, offer practically infinite shelf life, faster cycle time, the ability to be recycled/reformed, improved damage tolerance properties, as well as moisture and chemical resistance.

However, widespread adoption of thermoplastic materials in some industries, such as the aircraft industry, has been limited as a result of challenges with thermoplastic component manufacturing and repair. For example, some repairs require a portion of a thermoplastic component to be removed. Existing processes include scaping a surface of the thermoplastic component to remove the desired portion of the component. Scraping can be time consuming and expensive, and if the component includes reinforcement layers, scraping through the reinforcement layers can be quite difficult. What is needed is an improved method of removing a portion of a thermoplastic component.

SUMMARY OF THE INVENTION

According to an aspect of the present disclosure a method of removing a portion of a thermoplastic component is provided. The thermoplastic component includes a thermoplastic material having a melting temperature. The method includes: a) providing a glider having a body portion and a separator portion, the glider having a length that extends between a first lateral end and a second lateral end, and a width, the glider comprising an electrically conductive material operable to produce thermal energy resulting from electrical resistance; b) heating at least a portion of the glider with electrical energy to a glider operating temperature that is equal to or greater than the melting temperature of the thermoplastic material; and c) removing the portion of the thermoplastic component by engaging the thermoplastic component with the glider and translating one of the glider or the thermoplastic component relative to the other of the glider or the thermoplastic component. The engagement of the glider and the thermoplastic component causes an amount of the thermoplastic material comprising the thermoplastic component to melt, and the translation of the one of the glider or the thermoplastic component relative to the other of the glider or the thermoplastic component removes the portion from the thermoplastic component.

According to another aspect of the present disclosure, a system for removing a portion of a thermoplastic component is provided. The thermoplastic component includes a thermoplastic material having a melting temperature. The system includes a glider, a glider heating system, and a controller. The glider has a body portion, a separator portion, a length that extends between a first lateral end and a second lateral end, and a width. The glider includes an electrically conductive material operable to produce thermal energy resulting from electrical resistance. The glider heating system is in communication with the glider. The glider heating system is operable to cause at least a portion of the glider to increase in temperature to a glider operating temperature that is equal to or greater than the melting temperature of the thermoplastic material. The controller is in communication with the glider heating system and a non-transitory memory storing instructions. The instructions when executed cause the controller to control the glider heating system to cause the at least a portion of the glider to increase in temperature to the glider operating temperature.

In any of the aspects or embodiments described above and herein, the separator portion of the glider may be wedge-shaped having a wedge upper surface and a wedge lower surface that intersect at a forward edge.

In any of the aspects or embodiments described above and herein, at least one of the wedge upper surface and the wedge lower surface may be planar.

In any of the aspects or embodiments described above and herein, the glider body portion may include an upper body surface opposite a lower body surface, and the wedge upper surface may extend between the upper body surface and the forward edge, and the wedge lower surface may extend between the lower body surface and the forward edge.

In any of the aspects or embodiments described above and herein, the glider body portion may include an upper body surface opposite a lower body surface, and the separator portion of the glider may include an upper surface that extends between the upper body surface and the lower body surface, intersecting at a forward edge, and an acute angle is formed by the glider upper surface and the lower body surface adjacent the forward edge.

In any of the aspects or embodiments described above and herein, the glider may consist of the electrically conductive material operable to produce thermal energy resulting from electrical resistance.

In any of the aspects or embodiments described above and herein, the electrically conductive material may be disposed in a ceramic material.

In any of the aspects or embodiments described above and herein, electrical current may be provided directly to the glider in an amount sufficient to heat at least a portion of the glider to the glider operating temperature.

In any of the aspects or embodiments described above and herein, the glider may be subjected to one or more electromagnetic fields sufficient to cause at least a portion of the glider to reach the glider operating temperature.

In any of the aspects or embodiments described above and herein, an actuator that moves the glider relative to the thermoplastic component may be utilized or included in the system.

In any of the aspects or embodiments described above and herein, an actuator that moves the thermoplastic component relative to the glider may be utilized or included in the system.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Components made from thermoplastic composite materials are utilized in a variety of different applications, including but not limited to aircraft components. From time to time during manufacture or repair of thermoplastic components, there is a need to remove a portion of the thermoplastic material from the thermoplastic component. For example, thermoplastic components will sometimes have defects produced during manufacturing or incurred during use that would benefit from repair. Aspects of the present disclosure include a new, unobvious method for removing a portion of the thermoplastic material (e.g., containing a defect) from a thermoplastic component.

The term "thermoplastic component" as used herein includes components comprised partially or entirely of a thermoplastic material. The present disclosure method for removing a portion of a thermoplastic component can be used on a new thermoplastic component or a used thermoplastic component. A new thermoplastic component, for example, may be formed with a defect; e.g., a region containing an undesirable void, crack, excessive porosity, or a region having an undesirable polymeric constituency, or delamination, etc. A used thermoplastic component, on the other hand, may have an area that is worn or eroded over time, or mechanically, thermally, and/or chemically deformed or altered during use. Thermoplastic components may be formed from homogenous material or may be layered; e.g., a stack of layers with thermoplastic material disposed between layers. A thermoplastic body may comprise a plurality of portions that are joined together along a weld line where thermoplastic material bonds the aforesaid bodies together. Regardless of whether the component is new or used, or the nature of the defect, or whether the thermoplastic component is homogenous or layered, or whether the thermoplastic component comprises a plurality of bodies that are bonded together, or the reason why it is desirable to remove a portion of a thermoplastic component, the present disclosure provides a new and unobvious system and method for removing the portion of the component identified for removal. The term "removal portion" will be used herein to mean any volumetric region of a thermoplastic component that a user wishes to remove for any reason. The present disclosure method may be utilized on a variety of different thermoplastic materials and is therefore not limited to any particular thermoplastic material.

Figure 1:
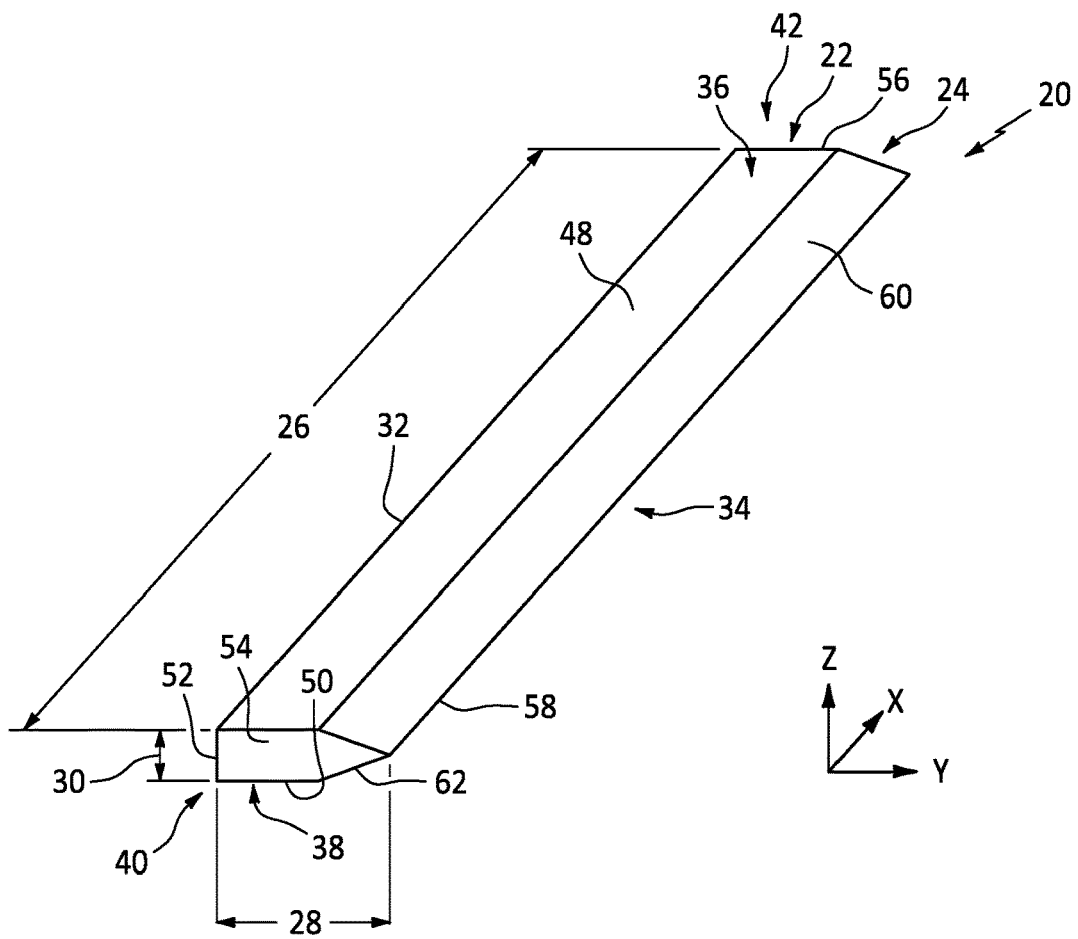
FIG. 1 is a diagrammatic perspective view of a present disclosure glider embodiment.
Figure 2:
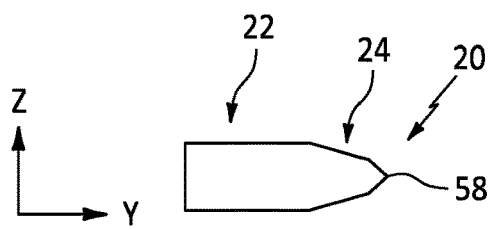
FIG. 2 is a diagrammatic end view of a present disclosure glider embodiment.
Figure 3:
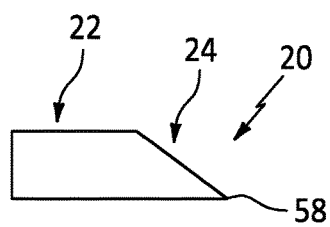
FIG. 3 is a diagrammatic end view of a present disclosure glider embodiment.
Figure 4:
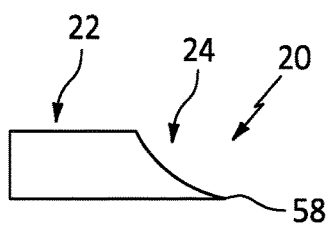
FIG. 4 is a diagrammatic end view of a present disclosure glider embodiment.

Referring to FIG. 1, the present disclosure utilizes a glider 20 having a body portion 22 and a separator portion 24. The glider 20 may be described as having a length 26, a width 28, a thickness 30, an aft 32, a front 34, a top 36, a bottom 38, a first lateral end 40, and a second lateral end 42. The length, width, and thickness 26, 28, 30 are orthogonal one another; e.g., the length 26 extends along an X-axis, the width 28 extends along a Y-axis, and the thickness 30 extends along a Z-axis. As will be described herein, the glider 20 may be used to remove a portion of the thermoplastic component 44 and the separator portion 24 is configured to facilitate separation of a removal portion 46 from the remainder of the thermoplastic component 44. The glider 20 diagrammatically shown in FIG. 1 extends lengthwise along a straight line. In some embodiments, the glider 20 may extend lengthwise along other than a straight line; e.g., extend lengthwise along an arcuate line.

Figure 5:
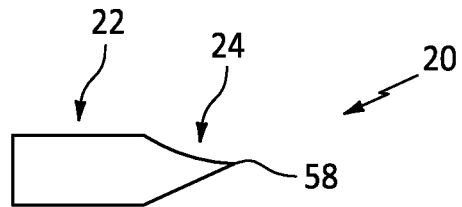
FIG. 5 is a diagrammatic end view of a present disclosure glider embodiment.
Figure 6:
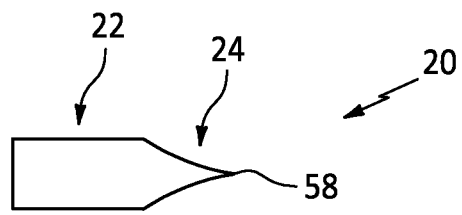
FIG. 6 is a diagrammatic end view of a present disclosure glider embodiment.

In the glider 20 embodiment shown in FIG. 1, the glider body 22 includes an upper body surface 48, a bottom body surface 50, an aft body surface 52, a first lateral end surface 54, and a second lateral end surface 56. In this embodiment, the separator portion 24 is wedge-shaped defining a forward edge 58 of the glider 20, a planar wedge upper surface 60 that extends between the forward edge 58 and the upper body surface 48 of the glider body 22 between the first and second lateral end surfaces 54, 56, and a planar wedge lower surface 62 that extends between the forward edge 58 and the bottom body surface 50 of the glider body 22 between the first and second lateral end surfaces 54, 56. This wedge shape formed by the planar upper and lower wedge surfaces 60, 62 is a non-limiting example of a separator portion 24 configuration. Alternatively, a separator portion 24 may be defined by more than two surfaces (e.g., see FIG. 2) or a single surface (e.g., see FIGS. 3 and 4). In some embodiments, one or more of the surfaces that define the separator portion 24 may be arcuate. FIG. 5 illustrates a separator portion 24 defined by an arcuate surface and a planar surface. FIG. 6 illustrates a separator portion 24 defined by a pair of arcuate surfaces. The diagrammatic representations of FIGS. 1-6 are provided to illustrate examples of the separator portion 24 geometry and the present disclosure is not limited thereto.

Figure 7:
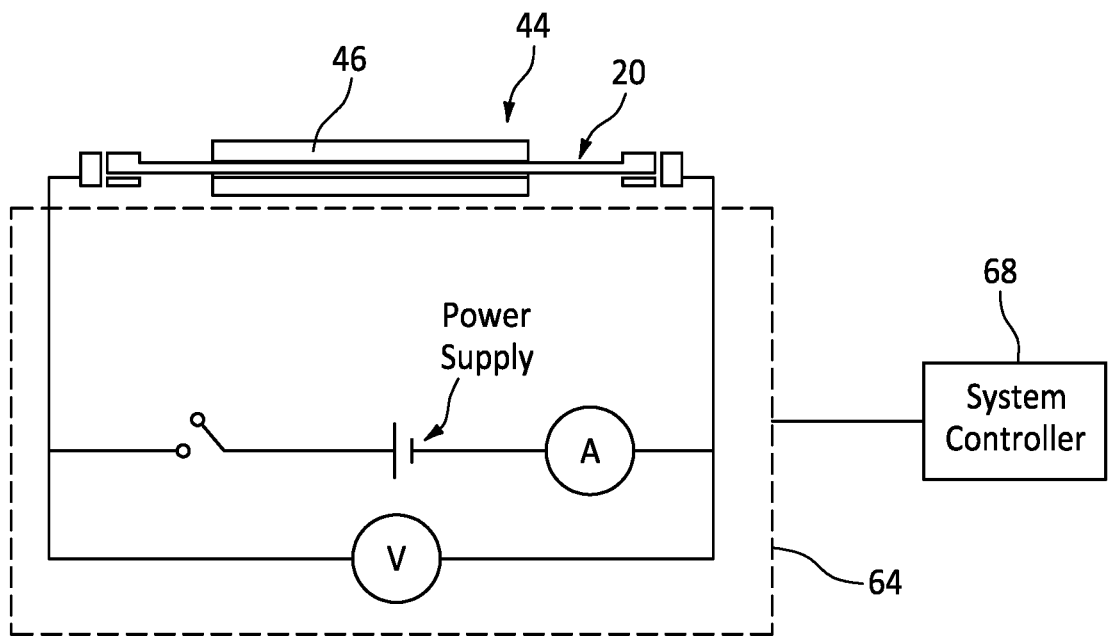
FIG. 7 is a schematic representation of a present disclosure system embodiment.
Figure 8:
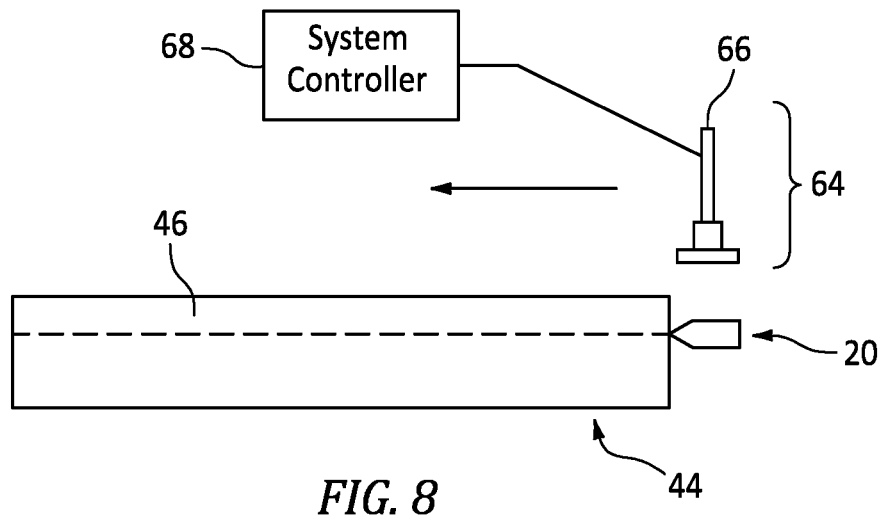
FIG. 8 is a schematic representation of a present disclosure system embodiment.

The glider 20 is configured to produce thermal energy (e.g., increase in temperature) resulting from electrical resistance within the glider 20 when the glider 20 is subjected to a source of electrical energy. The term "electrical energy" as used herein refers to electrical current directly input to the glider 20 or electrical current produced in the glider 20 resulting from electromagnetic fields applied to the glider 20. FIG. 7, discussed in greater detail below, diagrammatically illustrates an embodiment that includes an electrical circuit with a power source in communication with a glider 20. FIG. 8, also discussed in greater detail below, diagrammatically illustrates an embodiment having an induction heater in proximity to the glider 20 for subjecting the glider 20 to electromagnetic fields. The present disclosure is not limited to the embodiments shown in FIGS. 7 and 8, and collectively these systems and other systems that may be used to produce thermal energy in the glider 20 using electrical energy will be referred to hereinafter as "glider heating systems".

The material of the glider 20 is chosen to produce the aforesaid thermal energy. In some embodiments, the glider 20 may comprise a high electrical resistivity material that conducts electricity. In some embodiments, all (or substantially all) of the glider 20 may comprise the high electrical resistivity material. Non-limiting examples of such a material include steel, tungsten, carbon, and the like, and alloys of the same. In other embodiments, the glider 20 may be formed as a composite that includes a high electrical resistivity material that conducts electricity. For example, some glider 20 embodiments may be formed from a composite that includes one or more ceramic materials combined with a metallic material (e.g., stainless steel mesh, etc.). Some glider 20 embodiments may be configured such that the entire glider 20 is intended to be operated at an elevated temperature; e.g., a glider 20 entirely comprised of a high electrical resistivity material. Other glider 20 embodiments may be configured to purposely produce elevated surface temperatures at select exterior surfaces (e.g., the glider body upper and bottom body surfaces 48, 50, the wedge upper and lower surfaces 60, 62, the separator portion 24 in proximity to the forward edge 58, etc., or combinations thereof) and have lower surface temperatures at other exterior surfaces (e.g., lateral end surfaces 54, 56, or glider body surfaces proximate the aft of the glider 20, etc.). A glider 20 configured to produce elevated surface temperatures at select exterior surfaces may be configured in a variety of ways. For example, portions of the glider 20 other than the select exterior surface regions desired to be at elevated temperatures may be comprised of a material that produces less or no resistive heating and the select exterior surface regions desired to be at elevated temperatures may comprised a material that produces substantial resistive heating. In these latter embodiments, the difference in exterior surface temperature may help avoid attachment of thermoplastic material to the glider 20 and/or produce improved surface characteristics along surfaces produced during the removal process.

In some embodiments, surfaces of the glider 20 may be configured to avoid or minimize the potential of thermoplastic material attachment to the glider 20 during operation and/or to facilitate movement of the glider 20 through the thermoplastic material of the thermoplastic component. For example, one or more coatings or release agents may be applied to glider exterior surfaces to facilitate movement of the glider 20 through the thermoplastic material. A non-limited example of a release agent that may be used is the Frekote® release agent produced by the Henkel Corporation. A non-limiting example of a ceramic based coating that may be used is a Cerakote coating produced by NIC Industries. Other non-limiting examples of a coating that may be applied to glider exterior surfaces to facilitate movement of the glider 20 through the thermoplastic material include polytetrafluoroethylene ("PTFE") and polyimide ("PP").

The above examples of glider material and configuration are provided to illustrate examples of glider 20 construction and the present disclosure is not limited thereto.

As indicated above, embodiments of the present disclosure system include a glider heating system 64 operable to elevate the temperature of (all or less than all of) the glider 20. In some embodiments, a glider heating system 64 may be configured to cause the glider 20 to be heated to a single predetermined temperature. In some embodiments, a glider heating system 64 may be configured to selectively cause the glider 20 to be heated to a plurality of different predetermined temperatures to accommodate different thermoplastic materials have different melting temperatures, or variable temperatures selected by an operator. As shown in FIG. 7, in some embodiments a glider heating system 64 may include an electrical circuit having a power supply. The electrical circuit is in communication with the glider 20; e.g., electrically connected to the lateral ends of the glider 20. The electrical circuit may include one or more of a voltmeter, an ammeter, and one or more switches to facilitate control of the glider heating system 64. These type of glider heating systems 64 may be used with various different glider 20 configurations, including a glider 20 formed from a metallic material; e.g., steel. Electrical resistance within the electrically conductive material of the glider 20 produces the desired heating of the glider 20. As shown in FIG. 8, in some embodiments a glider heating system 64 may include one or more induction heaters 66 each configured to selectively produce an electromagnetic field that interacts with electrically conductive material disposed in the glider 20. For example, the induction heater 66 may include an electromagnet and an electronic oscillator that passes a high-frequency alternating current (AC) through the electromagnet. The rapidly alternating magnetic field penetrates the glider 20, generating eddy currents in the electrically conductive material of the glider 20. Here again, electrical resistance within the electrically conductive material of the glider 20 produces the desired heating of the glider 20. In some embodiments, the glider heating system 64 may include a plurality of induction heaters 66 disposed along the length of the glider 20 to heat the glider 20 along substantially all of its length. In other embodiments, the glider heating system 64 may include one or more induction heaters 66 that are movable along the length of the glider 20; e.g., along the X-axis. In those embodiments where the glider 20 is movable relative to the thermoplastic component workpiece 44, the induction heaters 66 may also be movable (e.g., along the Y-axis) so as to stay in alignment with the glider 20. Conversely, present disclosure system embodiments may be configured to move a thermoplastic component workpiece 44 relative to a stationary glider 20. In these embodiments, the induction heater(s) 66 may remain stationary and aligned with the glider 20.

As indicated above, the present disclosure may be configured to permit movement of the glider 20 relative to the thermoplastic component workpiece 44 to separate a removal portion 46 of the thermoplastic component 44, or conversely to permit movement of the thermoplastic component 44 relative to the glider 20 to separate a removal portion 46. Regarding the former, embodiments of the present disclosure may be configured as a portable unit that can be manually moved by an operator; e.g., by hand alone, or in combination with "guide" structure that maintains the relative positions of the glider 20 and the thermoplastic component workpiece 44. In some embodiments, the present disclosure may be configured for attachment to a robotic actuator (not shown) that is configured to move the glider 20 relative to a thermoplastic component workpiece 44. Regarding the latter, the present disclosure glider 20 may be attached to structure that maintains the glider 20 stationary (possibly permitting some relative movement for depth of cut, etc.) and permits movement of the thermoplastic component workpiece 44 relative to the glider 20 (manually or in an automated fashion) to separate a removal portion 46.

In some embodiments, the present disclosure may include a system controller 68 in communication with a glider heating system 64, sensors (e.g., temperature sensors, force sensors operable to sense an amount of force on the glider 20 during operation, etc.), actuation systems for actuating the glider 20 relative to the thermoplastic workpiece and/or vice versa, and the like to control and or receive signals therefrom to perform the functions described herein. The system controller 68 may include any type of computing device, computational circuit, processor(s), CPU, computer, or the like capable of executing a series of instructions that are stored in memory. The system controller 64 may be configured as hardware or software or any combination thereof. The instructions may include an operating system, and/or executable software modules such as program files, system data, buffers, drivers, utilities, and the like. The executable instructions may apply to any functionality described herein to enable the system to accomplish the same algorithmically and/or coordination of system components. The system controller may include a single memory device, or a plurality of memory devices and the present disclosure is not limited to any particular type of memory device. The system controller 64 may include, or may be in communication with, an input device that enables an operator to enter data and/or instructions, and may include, or be in communication with, an output device configured, for example to display information (e.g., a visual display or a printer), or to transfer data, etc. Communications between the system controller and other system components (e.g., glider heating system 64, sensors, actuation systems, etc.) may be via a hardwire connection or via a wireless connection.

Figure 9:
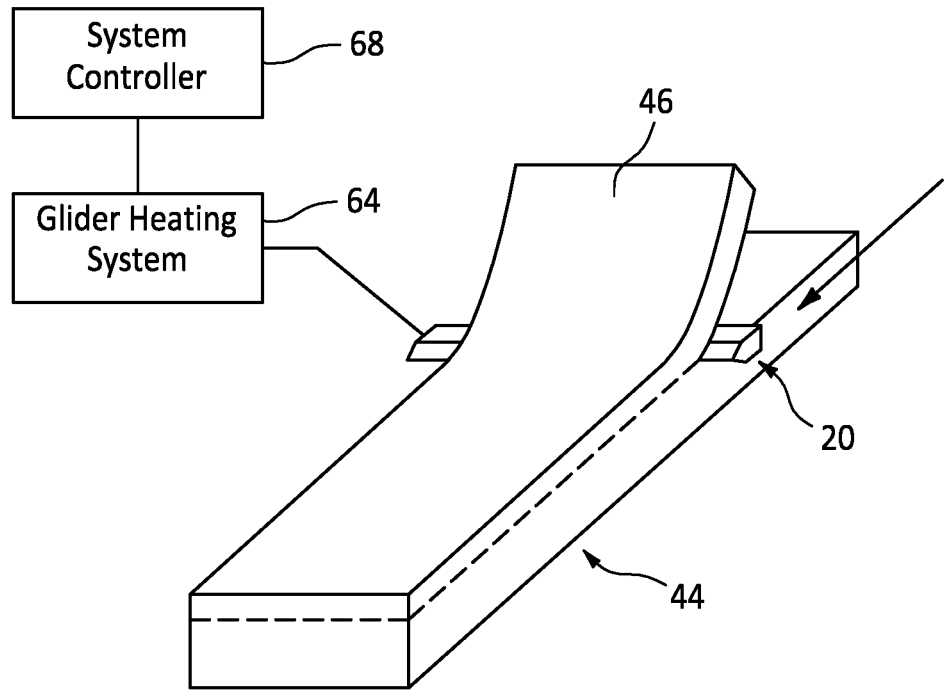
FIG. 9 is a schematic representation of a present disclosure system embodiment.

A first example of the present disclosure system and method may be described in terms of removing a removal portion 46 of a thermoplastic component 44 generically shown as a rectangular body in FIG. 9. The system controls the glider heating system 64 to heat the glider 20 to a temperature that is at or above the melting temperature of the thermoplastic material comprising the thermoplastic component 44. Once the glider 20 is at the desired temperature, the glider 20 may be positioned relative to the thermoplastic component workpiece 44 to align the glider 20 at the depth of cut desired to remove the removal portion 46 from the thermoplastic component workpiece 44. The glider 20 is subsequently moved relative to the thermoplastic component workpiece 44 to initiate contact there between, and through the thermoplastic component workpiece 44 along a cut line. As the glider 20 passes through the thermoplastic component workpiece 44, the elevated temperature of the glider 20 causes the thermoplastic material of the thermoplastic component workpiece 44 proximate the glider 20 to melt. Because the melting is localized relative to the cut line, portions of the thermoplastic component workpiece 44 (and the removal portion 46) not in close proximity to the cut line are not melted and therefore retain solid form. The feed rate of the glider 20 through the thermoplastic component workpiece 44 may be chosen based on the material of the thermoplastic component workpiece 44 and other factors to ensure melting occurs and therefore proper separation between the thermoplastic component workpiece 44 (less the removal portion 46) and the removal portion 46. The thermoplastic material proximate the cut line post separation will cool below the melting point of the thermoplastic material. In some applications, the rate of cooling is sufficient to prevent rejoinder. In some applications, the process may involve structure that maintains the removal portion 46 separate from the thermoplastic component workpiece 44 until cooling adequate to prevent rejoinder has occurred.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A method of removing a portion of a thermoplastic component, the thermoplastic component comprising a thermoplastic material having a melting temperature, the method comprising:
   providing a glider having a body portion and a separator portion, the glider having a length that extends between a first lateral end and a second lateral end, and a width, the glider comprising an electrically conductive material operable to produce thermal energy resulting from electrical resistance, wherein the electrically conductive material is disposed in a ceramic material;
   heating at least a portion of the glider with electrical energy to a glider operating temperature that is equal to or greater than the melting temperature of the thermoplastic material; and
   removing the portion of the thermoplastic component by engaging the thermoplastic component with the glider and translating one of the glider or the thermoplastic component relative to the other of the glider or the thermoplastic component, wherein the engagement of the glider and the thermoplastic component causes an amount of the thermoplastic material comprising the thermoplastic component to melt, and the translation of the one of the glider or the thermoplastic component relative to the other of the glider or the thermoplastic component removes the portion from the thermoplastic component.

2. The method of claim 1, wherein the separator portion of the glider is wedge-shaped having a wedge upper surface and a wedge lower surface that intersect at a forward edge.

3. The method of claim 2, wherein at least one of the wedge upper surface and the wedge lower surface is planar.

4. The method of claim 2, wherein the glider body portion includes an upper body surface opposite a lower body surface, and the wedge upper surface extends between the upper body surface and the forward edge, and the wedge lower surface extends between the lower body surface and the forward edge.

5. The method of claim 1, wherein the glider body portion includes an upper body surface opposite a lower body surface, and the separator portion of the glider includes an upper surface that extends between the upper body surface and the lower body surface, intersecting at a forward edge, and wherein an acute angle is formed by the glider upper surface and the lower body surface adjacent the forward edge.

6. A method of removing a portion of a thermoplastic component, the thermoplastic component comprising a thermoplastic material having a melting temperature, the method comprising:
   providing a glider having a body portion and a separator portion, the glider having a length that extends between a first lateral end and a second lateral end, and a width, the glider comprising an electrically conductive material operable to produce thermal energy resulting from electrical resistance;
   heating at least a portion of the glider with electrical energy to a glider operating temperature that is equal to or greater than the melting temperature of the thermoplastic material, the heating step including providing one or more electromagnetic fields to the glider sufficient to cause the at least a portion of the glider to reach the glider operating temperature; and
   removing the portion of the thermoplastic component by engaging the thermoplastic component with the glider and translating one of the glider or the thermoplastic component relative to the other of the glider or the thermoplastic component, wherein the engagement of the glider and the thermoplastic component causes an amount of the thermoplastic material comprising the thermoplastic component to melt, and the translation of the one of the glider or the thermoplastic component relative to the other of the glider or the thermoplastic component removes the portion from the thermoplastic component.

7. A system for removing a portion of a thermoplastic component, the thermoplastic component comprising a thermoplastic material having a melting temperature, the system comprising:
   a glider having a body portion, a separator portion, a length that extends between a first lateral end and a second lateral end, and a width, the glider comprising an electrically conductive material operable to produce thermal energy resulting from electrical resistance;
   a glider heating system in communication with the glider, the glider heating system operable to cause at least a portion of the glider to increase in temperature to a glider operating temperature that is equal to or greater than the melting temperature of the thermoplastic material, wherein the glider heating system is configured to produce electromagnetic fields to the glider sufficient to heat the at least a portion of the glider to the glider operating temperature; and
   a controller in communication with the glider heating system and a non-transitory memory storing instructions, which instructions when executed cause the controller to control the glider heating system to cause the at least a portion of the glider to increase in temperature to the glider operating temperature.

8. The system of claim 7, wherein the separator portion of the glider is wedge-shaped having a wedge upper surface and a wedge lower surface that intersect at a forward edge.

9. The system of claim 8, wherein at least one of the wedge upper surface and the wedge lower surface is planar.

10. The system of claim 8, wherein the glider body portion includes an upper body surface opposite a lower body surface, and the wedge upper surface extends between the upper body surface and the forward edge, and the wedge lower surface extends between the lower body surface and the forward edge.

11. The system of claim 7, wherein the glider body portion includes an upper body surface opposite a lower body surface, and the separator portion of the glider includes an upper surface that extends between the upper body surface and the lower body surface, intersecting at a forward edge, and wherein an acute angle is formed by the glider upper surface and the lower body surface adjacent the forward edge.

12. The system of claim 7, further comprising an actuator that moves the glider relative to the thermoplastic component.

13. The system of claim 7, further comprising an actuator that moves the thermoplastic component relative to the glider.

14. A system for removing a portion of a thermoplastic component, the thermoplastic component comprising a thermoplastic material having a melting temperature, the system comprising:
   a glider having a body portion, a separator portion, a length that extends between a first lateral end and a second lateral end, and a width, the glider comprising an electrically conductive material operable to produce thermal energy resulting from electrical resistance, wherein the electrically conductive material is disposed in a ceramic material;

a glider heating system in communication with the glider, the glider heating system operable to cause at least a portion of the glider to increase in temperature to a glider operating temperature that is equal to or greater than the melting temperature of the thermoplastic material; and a controller in communication with the glider heating system and a non-transitory memory storing instructions, which instructions when executed cause the controller to control the glider heating system to cause the at least a portion of the glider to increase in temperature to the glider operating temperature.

* * * * *